US010726447B2

(12) United States Patent
Weston et al.

(10) Patent No.: US 10,726,447 B2
(45) Date of Patent: *Jul. 28, 2020

(54) METHOD AND APPARATUS FOR RELAYING OF ADVERTIZING CONTENT

(71) Applicant: DEVNET, INC., Raleigh, NC (US)

(72) Inventors: Ian Weston, York (GB); Timothy John Ocock, London (GB)

(73) Assignee: DEVNET, INC., Raleigh, NC (US)

( * ) Notice: Subject to any disclaimer, the term of this patent is extended or adjusted under 35 U.S.C. 154(b) by 777 days.

This patent is subject to a terminal disclaimer.

(21) Appl. No.: 15/138,918

(22) Filed: Apr. 26, 2016

(65) Prior Publication Data

US 2017/0308928 A1 Oct. 26, 2017

(51) Int. Cl.
*G06Q 30/00* (2012.01)
*G06Q 30/02* (2012.01)
*G06F 15/173* (2006.01)
*H04L 29/08* (2006.01)
*H04L 29/06* (2006.01)

(52) U.S. Cl.
CPC ....... *G06Q 30/0257* (2013.01); *H04L 63/101* (2013.01); *H04L 67/20* (2013.01); *H04L 67/2819* (2013.01)

(58) Field of Classification Search
None
See application file for complete search history.

(56) References Cited

U.S. PATENT DOCUMENTS

| | | | |
|---|---|---|---|
| 7,099,870 B2 | 8/2006 | Hsu et al. | |
| 8,812,363 B2 | 8/2014 | Swix et al. | |
| 8,898,161 B2 | 11/2014 | Grant et al. | |
| 8,918,331 B2 | 12/2014 | Edwards | |
| 9,165,301 B2 | 10/2015 | Matthys et al. | |
| 2006/0031404 A1* | 2/2006 | Kassab | H04L 67/2804 709/218 |
| 2006/0136372 A1 | 6/2006 | Schunemann | |
| 2007/0078714 A1 | 4/2007 | Ott, IV et al. | |
| 2007/0136136 A1 | 6/2007 | Nossik | |
| 2007/0180147 A1* | 8/2007 | Leigh | G06Q 30/02 709/246 |
| 2008/0306814 A1* | 12/2008 | Hudson | G06Q 30/02 705/14.73 |
| 2009/0300594 A1 | 12/2009 | Kozhukh | |
| 2009/0313318 A1* | 12/2009 | Dye | G06Q 30/00 709/202 |

(Continued)

FOREIGN PATENT DOCUMENTS

KR  10-2008-0105129 A  12/2008

*Primary Examiner* — Yehdega Retta
(74) *Attorney, Agent, or Firm* — Burr & Forman, LLP

(57) ABSTRACT

A method for relaying advertising content may include intercepting, at a network providing communication between an end user device and one or more servers capable of responding to requests from the end user device, a request from the end user device and transmitted via the network, determining whether a response to the request will include advertizing content based on a destination of the request, intercepting the response based on the determination, modifying the response to modify source indicia of the advertizing content in a modified response, and enabling the modified response to be provided to the end user device to effectively relay the advertizing content from a different source.

20 Claims, 3 Drawing Sheets

(56) References Cited

U.S. PATENT DOCUMENTS

| | | | |
|---|---|---|---|
| 2011/0040626 A1* | 2/2011 | Lin | .................... G01C 21/3682 |
| | | | 705/14.63 |
| 2011/0258032 A1 | 10/2011 | Vadlamani et al. | |
| 2012/0078727 A1* | 3/2012 | Lee | ........................ G06Q 30/02 |
| | | | 705/14.66 |
| 2014/0046778 A1 | 2/2014 | Olson et al. | |
| 2014/0129325 A1 | 5/2014 | Zinger et al. | |
| 2014/0181634 A1 | 6/2014 | Compain et al. | |
| 2015/0302462 A1 | 10/2015 | Chan et al. | |

\* cited by examiner

METHOD AND APPARATUS FOR RELAYING OF ADVERTIZING CONTENT

TECHNICAL FIELD

Example embodiments generally relate to techniques for managing advertizing content provision and, in particular, relate to apparatuses (and/or methods executable by configured apparatuses) that are configured to facilitate the same.

BACKGROUND

Access service operators including owners of private networks, such as businesses, or those offering public internet access such as airlines, aircraft and airports, as well as shopping malls, coffee shops, hotels, and general access Internet service providers offer Internet access to an audience that is essentially captive. Accordingly, access service operators have the opportunity to provide better targeted advertizing to their audience, or eliminate competing ads by blocking advertizing from competitors from being visible within the operator's computer network. Replacing or removing ads can also reduce network bandwidth usage in some cases, and therefore can lower costs in operating the access service. Thus, access service operators may be expected to have an incentive to employ techniques for providing targeted advertizing to end users, or to eliminate or restrict the advertizing on their networks. Access service operators may also wish to provide other services such as defeating ad blockers, augmenting ads and protecting end users from advertizing that may be infected with viruses.

End users may also wish to eliminate advertizing altogether, finding it obtrusive to their use of the Internet. In other cases, end users may prefer to receive advertizing that is better targeted to their personal interests on an opt-in basis. While digital advertizing is theoretically targeted and, in particular the use of re-targeting (i.e., showing an advertisement for something a particular user previously expressed interest in or purchased) is commonplace, in practice targeted advertizing is often clumsy, simplistic and/or unwelcome. Even when targeted advertizing is performed in more elegant ways, such targeted advertizing typically relies upon large amounts of data captured by using tracking cookies to build a picture of individual users before it becomes remotely accurate. Moreover, end users often opt out of such tracking when given the chance.

Accordingly, it may be desirable to generate improved targeted advertizing that addresses some of the issues described above.

BRIEF SUMMARY OF SOME EXAMPLES

Some example embodiments may enable the provision of a system that allows access service operators to intercept and control digital advertizing on their networks. In this regard, for example, some example embodiments may enable access service operators to intercept advertizing content at the edge of their respective networks, as close as possible to the end user. Thus, the identity and interests of the end user may be reliably known since the access service operator may be a known and trusted organization with which the end user has a direct relationship. After interception of the digital advertizing content, the content may be modified with respect to source indicia and, in some cases further modified with respect to technical properties or content. Thus, not only can the source of the digital advertizing content be modified, but in some cases the content could be modified or replaced. In some cases, the interception may also allow virus scanning or other protective services to be applied before any content is delivered to end users.

In one example embodiment, an apparatus provided at a network providing communication between an end user device and one or more servers capable of responding to requests from the end user device is described. The apparatus may include processing circuitry configured to, when executed intercept a request from the end user device and transmitted via the network, determine whether a response to the request will include advertizing content based on a destination of the request, intercept the response based on the determination, modify the response to modify source indicia of the advertizing content in a modified response, and enable the modified response to be provided to the end user device to effectively relay the advertizing content from a different source.

In another example embodiment, a method executable via operation of configured processing circuitry for relaying advertising content is provided. The method may include intercepting, at a network providing communication between an end user device and one or more servers capable of responding to requests from the end user device, a request from the end user device and transmitted via the network, determining whether a response to the request will include advertizing content based on a destination of the request, intercepting the response based on the determination, modifying the response to modify source indicia of the advertizing content in a modified response, and enabling the modified response to be provided to the end user device to effectively relay the advertizing content from a different source.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
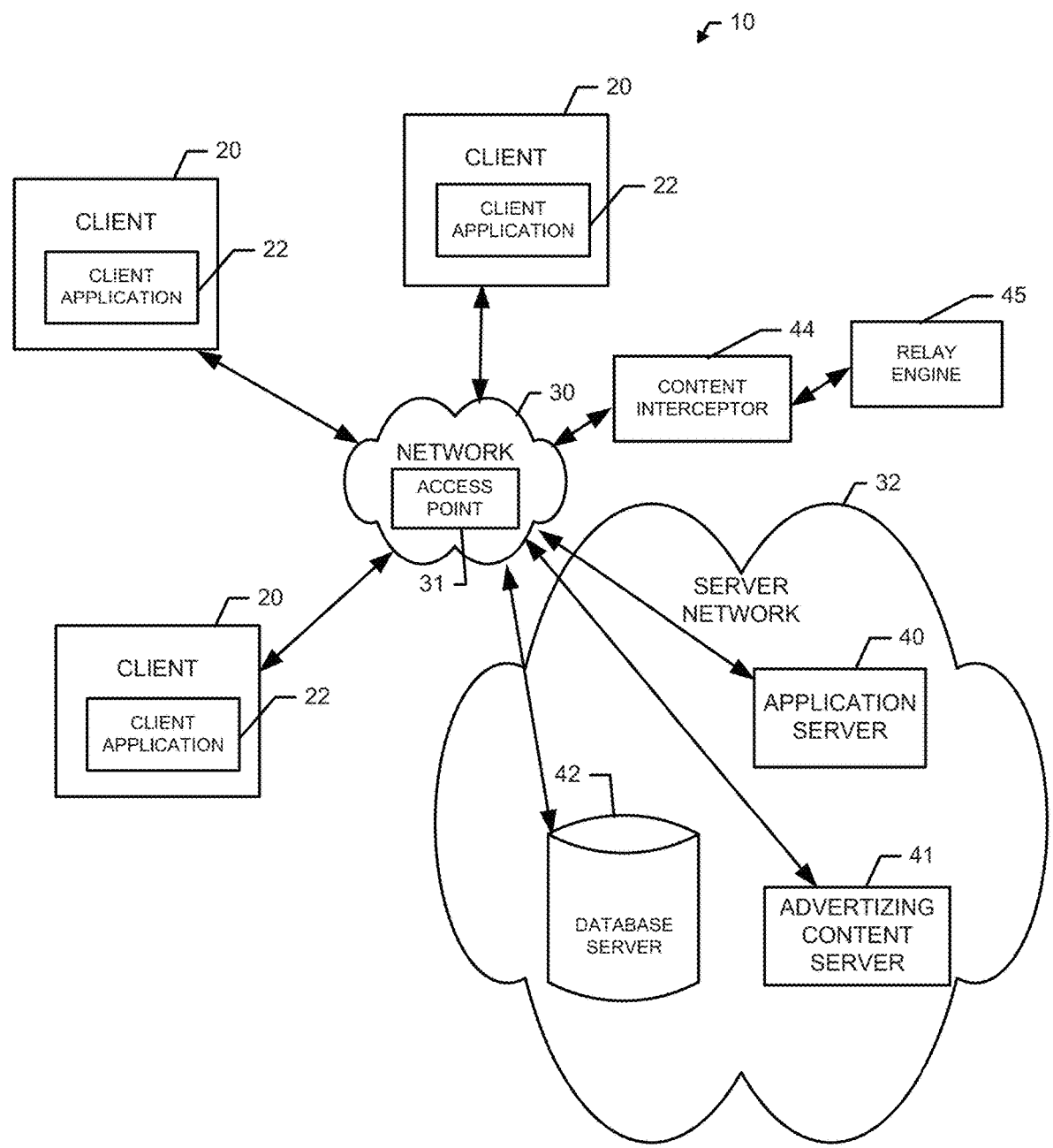
FIG. 1 illustrates a functional block diagram of a system that may be useful in connection with ad content relaying according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some example embodiments may relate to the provision of targeted advertisement modification executed at the network edge, as close to the end user as possible. The targeted advertisement modification is therefore capable of being more reliably targeted to the identity and interests of the end user, since the end user has a trusted relationship with the network operator. Moreover, the targeted advertisement modification is performed in such a way as to modify source indicia of the digital advertizing content provided in a targeted advertisement. Thus, the digital advertizing content will appear to come from a source other than its actual source. This alteration of source indicia may allow ad blockers that block based on the source to be defeated. As mentioned above, in addition to modifying source indicia of the digital advertizing content, other modifications of the content may be provided. For example, the content could be replaced with more relevant content for the particular end user to whom the content is being provided. Alternatively or additionally, the technical properties of the content may be modified, or the content itself may be modified as described herein. In any case, the provision of targeted advertizing content to the user may be more likely to be successful and, in some cases, content that is more likely to be acted upon may be supplied.

A challenge associated with achieving a system capable of targeted advertisement modification of an example embodiment is to enable such system to be built on top of existing advertizing infrastructure to enable migration without replacing existing infrastructure. This requires that existing advertizing related traffic should be identified and then removed, modified, or replaced, with modified content. Example embodiments enable targeted advertisement modification based on definitively knowing the end user and providing interception of advertizing related traffic one hop away from the customer (e.g., at the network edge). The content associated with the targeted advertisement may have its technical properties or the content itself modified in addition to having its source indicia modified. Ad blockers can therefore be defeated and content can reach its intended target.

An example embodiment of the invention will now be described in reference to FIG. 1. As shown in FIG. 1, a system 10 according to an example embodiment may include one or more end user devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced in connection with a single client connected to the system 10.

The clients 20 may, in some cases, each be associated with a single organization, department within an organization, or location (i.e., with each one of the clients 20 being associated with an individual employee or agent of an organization, department or location). However, in some embodiments, each of the clients 20 may be associated with different corresponding individuals, locations, departments or organizations. For example, among the clients 20, one client may be associated with a first individual and one or more of the other clients 20 may be associated with a second individual. In either case, each individual, or the organization may access a wireless communication network 30 to access the Internet or other content that may accessible via the network 30.

Each one of the clients 20 may include or otherwise be embodied as computing device (e.g., a computer, a network access terminal, a personal digital assistant (PDA), cellular phone, smart phone, or the like) capable of communication with or over the network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to interact with the network 30 in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for processing instructions to execute a particular application that can be monitored and classified remotely as described in greater detail below.

The client application 22 may be one of a selected group of applications executable at the clients 20, and the client applications on each device may be the same or different. Moreover, the clients 20 may execute the same or different applications simultaneously or at different respective times. Each respective one of various distinct examples of client applications 22 may have distinct communication characteristics associated therewith relative to the communication that occurs via the network 30 to support execution of the corresponding client application 22. As will be seen below, the distinct communication characteristics may be useful for determining whether one of the client applications 22 that is executing on any given one of the clients 20 is receiving advertising content in accordance with an example embodiment. Thus, in some cases, the client applications 22 may be web browsers or other applications for interacting with content servers via the Internet.

The network 30 may be a wired or wireless communication network such as an air-to-ground (ATG) communication network, a cellular network, or other data network, such as a local area network (LAN), a metropolitan area network (MAN), and/or the like that may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by wireline or wireless communication mechanisms and corresponding communication protocols. In any case, the network 30 may provide the "last hop" between other external networks or components (e.g., of a wide area network (WAN) such as the Internet). Thus, for example, the network 30 may include one or more access points 31 which the clients 20 may connect (e.g., wirelessly) to access the network 30. In such examples, the access points 31 may sometimes be WiFi access points. However, the access points 31 could alternatively be cell towers or other wireless or wireless communication structures, or Ethernet in wired network environments.

In an example embodiment, devices to which the clients 20 may be coupled via the network 30 may include one or more application servers (e.g., an application server 40, an advertising content server 41, and/or a database server 42, which together may form respective elements of a server network 32. The server network 32 should be appreciated as including servers that can be any combination of collocated or distributed servers and devices located anywhere throughout a WAN such as the Internet. Thus, although the application server 40, the advertising content server 41 and the database server 42 are each referred to as "servers," this does not necessarily imply that they are embodied on separate servers or devices. As such, for example, a single server or device may include some or each of the entities and the advertizing content server 41 or database server 42 could merely be represented by a server, database or group of servers/databases physically located on the same server or device as the application server 40.

The application server 40, the advertizing content server 41 and the database server 42 may each include hardware and/or software for configuring the application server 40, the advertizing content server 41 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information or content, or access to services associated with or accessible via execution of the client application 22. The information may also or alternatively include a program or series of executable files and/or instructions that are executable for performing various functions. The application server 40 may host functionality for responding to queries from end users based on execution of the client application 22. For example, where the client application 22 is a web browser, the application server 40 may provide data (e.g., via the database server 42), content or services requested by the client application 22. Moreover, in some cases, the client application 22 may access advertizing content from the advertizing content server 41 to include along with a response to a request made by the client application 22. The advertizing content may be associated with the service, content or function of the application server 40, or may otherwise be targeted advertisement content generated by any suitable method.

In many cases, the advertizing content stored at the advertizing content server 41 tends to follow particular formats. Moreover, most advertizing content accessible via the Internet tends to come from a limited selection of Internet addresses belonging to organizations that manage and syndicate most of the Internet advertizing (e.g., Google, DoubleClick, etc.). The advertizing operation infrastructure associated with these sources tends to be separated from other consumer facing services, and is therefore relatively easy to identify based on the source address. Existing advertisement blockers tend to identify content having a source address associated with a blacklist of advertizing content providers. Thus, by examining source indicia (e.g., information indicative of the source address of the advertizing content), a typical advertisement blocker (or ad blocker) can compare the source indicia to blacklist information to determine whether to block the corresponding advertizing content.

A typical URI will identify the file type (e.g., usually by the file name extension). However, identifying the dimensions associated with specific portions of content being served can also serve as a clue. Although, the dimensions of an image and information indicating whether the image is static or dynamic (e.g., animated) can typically only be determined by deep packet inspection, banner advertisements may have relatively standard sizes. Thus, an image associated with a banner advertisement may be expected to fit into one of a limited number of knowable combinations of width and height. When an image meeting a known combination of width and height that is associated with advertisements is encountered, an inference can be made that the image is likely advertizing content. Thus, by examining the technical properties of content, a determination can be made as to whether such content includes advertizing content.

In general, the client 20 (or client application 22) may interact with the server network 32 (e.g., the Internet) via the network 30 to send requests to the server network 32 via the network 30. The application server 40 at the server network 32 may generate a response to each of the requests, and the response may include content retrieved from locations including advertizing content from the advertizing content server 41. These responses would typically be routed back to the client 20 (or client application 22) via the network 30 and served to the end user and may include the advertizing content.

As discussed above, because the network 30 is the "last hop" to the client 20, and also generally has a trusted relationship with the client 20, the network 30 edge is an advantageous place from which to monitor requests and responses to such requests to either block, modify or replace advertizing content. However, example embodiments can be practiced from locations other than the edge of the network 30 as well. In an example embodiment, a content interceptor 44 (or interception engine) may be provided at the network 30 edge to intercept requests and/or responses to allow (and sometimes perform) advertizing content modification as described herein. In some embodiments, the content interceptor 44 may be employed to monitor the activity of one or more mobile devices (e.g., the clients 20) to determine whether responses to requests include advertizing content, and to further to determine whether to modify such advertizing content, and in what manner such modification is to be performed. In this regard, for example, the content interceptor 44 may include hardware and/or software for enabling the application server 40 to communicate with the clients 20 for the provision and/or receipt of information associated with performing activities as described herein via the network 30 in such a way that the communication can be intercepted and modified as described herein. As such, the environment of FIG. 1 illustrates an example in which provision of content and information associated with the execution of applications at the clients 20 via, for example, wireless communication of any type (e.g., WiFi, 3G, 4G, LTE, ATG networks, etc.) with the network 30 may be monitored and modified by the content interceptor 44 as described herein.

In some cases, the content interceptor 44 may include or otherwise be in communication with a relay engine 45. The relay engine 45 may be configured to modify source indicia for content identified after interception by the content interceptor 44 as being advertizing content. As such, the relay engine 45 may be configured to change the apparent source for the advertizing content. By changing the apparent source, ad blockers that block based on source indicia may be prevented from functioning as designed since the source indicia will be modified by the relay engine 45 to be indicative of a source that is not a known source (i.e., a source known to be an example of the advertizing content server 41).

Figure 2:
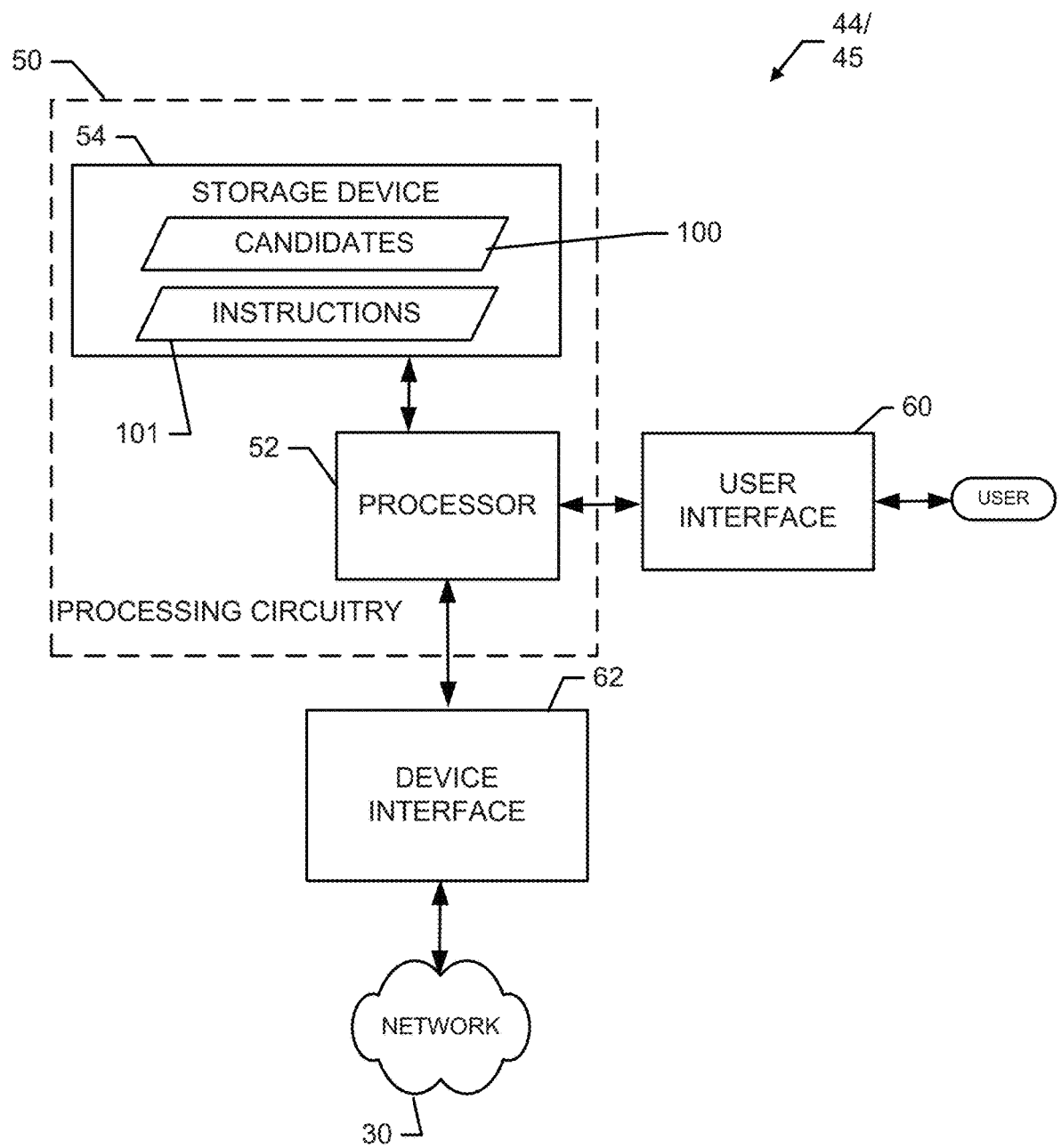
FIG. 2 illustrates a functional block diagram of an apparatus that may be useful in connection with ad content relaying according to an example embodiment.

An example embodiment of the invention will now be described with reference to FIG. 2. FIG. 2 shows certain elements of an apparatus for provision of the targeted advertizing content modification described herein according to an example embodiment. The apparatus of FIG. 2 may be employed, for example, on a device such as, for example, a network device, server, proxy, or the like at which the content interceptor 44 and/or relay engine 45 may be instantiated. Alternatively, embodiments may be employed on a combination of devices. Accordingly, some embodiments of the present invention may be embodied wholly at a single device or in a distributed environment. Furthermore, it should be noted that the devices or elements described below may not be mandatory and thus some may be omitted in certain embodiments.

Referring now to FIG. 2, an apparatus for provision of targeted advertizing content modification in accordance with an example embodiment is provided. The apparatus may be an embodiment of the content interceptor 44 and/or relay engine 45 or a device hosting the content interceptor 44 and/or relay engine 45. As such, configuration of the apparatus as described herein may transform the apparatus into the content interceptor 44 and/or relay engine 45. In an example embodiment, the apparatus may include or otherwise be in communication with processing circuitry 50 that is configured to perform data processing, application execution and other processing and management services according to an example embodiment of the present invention. The apparatus may be embodied as a proxy server at the network 30 edge in some cases.

In one embodiment, the processing circuitry 50 may include a storage device 54 and a processor 52 that may be in communication with or otherwise control a user interface 60 (which may be optional) and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 (if employed at all) may be disposed at another device that may be in communication with the processing circuitry 50 via the device interface 62 and/or a network (e.g., network 30).

The user interface 60 (if employed) may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located. In some cases, the user interface 60 may also include a series of menus, web pages or interface consoles generated to guide the user through various options, commands, flow paths and/or the like for control of or interaction with the content interceptor 44 and/or relay engine 45.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases that may store a variety of files, contents or data sets. Among the contents of the storage device 54, applications may be stored for execution by the processor 52 in order to carry out the functionality associated with each respective application. In some cases, contents of the storage device 54 may include replacement advertizing content or instructions for modifying advertizing content to change at least the source indicia of the advertizing content. Thus, the original supply source may be obfuscated. In some examples, contents of the storage device 54 may include instructions for modifying technical properties of the advertizing content so that, for example, typical advertizing content technical properties associated with common formats may be avoided after modification. Thus, for example, width or height parameters associated with the advertizing content may be adjusted by fixed or random values. As such, an image or banner may be adjusted by a fixed or random number of pixels. In some examples, contents of the storage device 54 may include instructions for modifying the content of the advertizing content itself so that, for example, extra content may be alpha blended in with the original content to fill in blanks or change artwork. Customization of elements or sub-elements of the advertizing content can therefore be accomplished to personalize advertizing content or tailor such content to specific desired purposes or campaigns. In some cases, the customization of elements or sub-elements may further include modification of the language of the elements or sub-elements based on a known preferred language of the end user. Thus, for example, if the end user visits a foreign country, in a typical situation, the end user would be served advertising content in the language of the foreign country even if the end user's browser is set to indicate their language preference. However, example embodiments may enable the content interceptor 44 and/or relay engine 45 to substitute either an equivalent advertisement in the appropriate language (if such content is available), a translated version of the advertizing content, or other content that is not necessarily directly related to the original advertising content but is in any case providable in the language indicated as the end user's language preference.

The modification of advertising content by the processing circuitry 50 (and therefore by the content interceptor 44 and/or relay engine 45) may be accomplished in such a way as to facilitate replacement or modification of at least some portions of selected advertisement content in a manner that is tailored to the target. Thus, for example, if the modification to be accomplished involves replacement of at least some portion of the advertizing content, then the replacement content may be stored in such a way that the modified content is different in terms of source indicia and/or technical properties. The technical properties of the selected advertisement content that is to be modified can therefore be modified, and in some cases affinity criteria may be used to determine either how to modify the content, so that the modified advertizing content that is received is most likely to be effective or well received by the end user based on knowledge about the end user. Thus, the affinity criteria may include scores, rankings or classifications of advertisements by type, genre, price or other distinguishing characteristics. The affinity criteria can be correlated to profile information of the end user (e.g., age, sex, demographic information, language preference, shopping patterns, identified interests (e.g., as determined by survey responses), etc.) to determine match scores or likelihood rankings for various items of modified content. The profile information may be used to identify modified advertizing content to be selected to replace or modify the selected advertisement content based on the match scores or likelihood rankings determined by correlation with the affinity criteria.

As an example, if the end user is a high net worth individual with an affinity for cars, the profile information of the end user may indicate as much by direct or indirect information gathered about the end user. Meanwhile, advertisements or modification instructions accessible to the content interceptor 44 and/or relay engine 45 for use in generating potential modified advertising content may include affinity criteria indicating that a particular advertisement is for a premium car brand based on cost and type (e.g., a car ad). When the content interceptor 44 identifies that a request made by the end user will be answered by a response including advertising content of a selected type, the content interceptor 44 may intercept the response and the relay engine 45 may remove the source indicia of the selected advertizing content and relay modified advertizing content from an apparently different source, thereby modifying the source indicia. This may ensure that the particular advertisement for the premium car brand is not blocked, and finds its way to the end user. In some cases, the content may be further modified to change technical properties, as described above, or further personalize or augment the advertizing content.

As another example, if an end user from Germany flies to the US to a particular vacation area, an ad for a popular local attraction may be targeted for the end user in English. The content interceptor 44 and/or relay engine 45 may operate together to intercept the ad and do one of three things including: 1) serve a German equivalent of the ad, 2) translate the text in the ad to German, or 3) substitute the ad for alternative content in German.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the content interceptor 44 and/or relay engine 45, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the content interceptor 44 and/or relay engine 45 as described herein.

The content interceptor 44 may be configured to remotely infer information about the response that is expected to be received for a particular intercepted request. The content interceptor 44 may also be configured to intelligently identify situations where source indicia modification is desirable to enable the relay engine 45 to perform such modification. In some cases, the content interceptor 44 may further be configured to modify advertising content that can be selected to be provided in the response instead of the selected advertizing content that would otherwise have been provided. In particular, the content interceptor 44 may be configured to operate at the edge of the network 30 to be able to intercept content at the last stop before it reaches the end user. The content interceptor 44 and/or relay engine 45 can therefore use specific knowledge of the end user to decide when content relaying or other content modification is best for the end user.

Essentially, the content interceptor 44 may be configured to recognize when advertizing content that is suitable for modification will come in a response to a user request. The content interceptor 44 may also be configured to intelligently select modified content (with the help of the relay engine 45) and make the relaying actions (e.g., source obfuscation) and other content modifications as close to the user as possible so that the modified content is provided without significant delay or error messages. The content interceptor 44 and/or relay engine 45 can therefore essentially operate in real time.

In an example embodiment, the storage device 54 may store a plurality of approved, selected, or otherwise allowable candidate source indicia (e.g., candidates 100). The candidates 100 may each be stored or otherwise organized for random assignment to incoming requests for modification of source indicia. In some cases, the storage device 54 may also store modification instructions (e.g., instructions 101) to allow content modification based on technical properties (e.g., size, shape, format, media type (e.g., interactive, image sequence, banner, etc.), metadata and/or the like). When the content interceptor 44 identifies a response from an end user, and determines that content modification is desirable, the content interceptor 44 may utilize the relay engine 45 to modify the source indicia and utilize the instructions 101 to determine any technical property modifications or other content alterations or personalizations to employ before the relayed content is provided to the end user.

Of note, in some cases, the candidates 100 and/or instructions 101 may be stored in a single repository (e.g., a single instance of the storage device 54). However, in other cases, the candidates 100 and/or instructions 101 may be in distributed locations (e.g., the storage device 54 embodied in a distributed fashion). In any case, the candidates 100 may be associated with partners or advertisers that are approved, whitelisted, or at least not known to be blacklisted. In some cases, the entire process could be implemented only if the user elects content modification. The content interceptor 44 may also be configured to employ location awareness to facilitate selection of content for modification in some cases. Thus, for example, at the network edge, useful context information may be determined (e.g., via metadata or other sources such as destination, arrival time, current location, etc.) to indicate the location of the user so that applicable advertizing content can be served (e.g., relative to commercial context, local geography, local climate and/or the like).

In some cases, the content interceptor 44 may be further configured to log or otherwise record activities undertaken by the content interceptor 44 and/or the relay engine 45 so that, for example, advertising content that is intercepted can be logged in a blockchain for audit purposes. Thus, the actual source can be tracked, and attribution or compensation can be provided after ad blocking is avoided using relaying and/or other ad content modification. Thus, in some examples, information indicative of whether the advertising content was received by the user or a different advertisement sent to the user as modified content may also be recorded.

Furthermore, in some cases, the content interceptor 44 may be configured to apply virus scanning, either directly or by interfacing with virus scanning tools. By adding virus scanning capability, enterprises or other users can ensure that advertizing content remains free from viruses to protect businesses and other visitors from infected ads.

Figure 3:
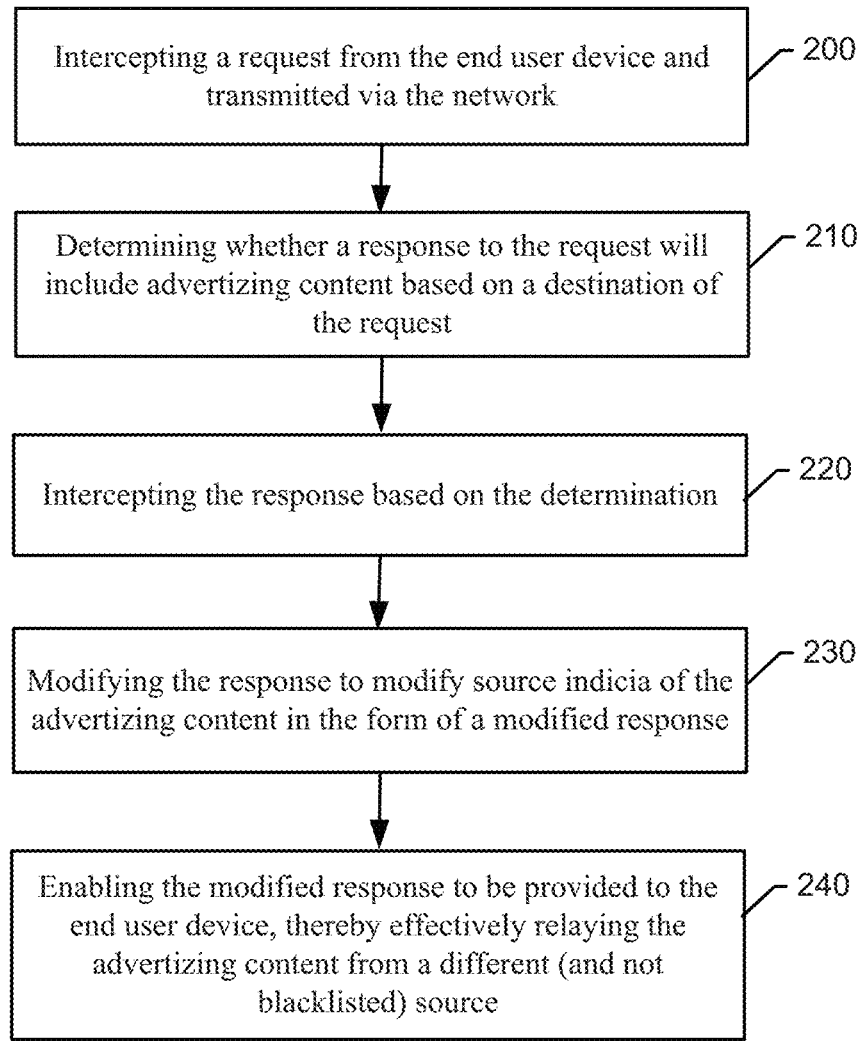
FIG. 3 illustrates a block diagram of a method for ad content relaying in accordance with an example embodiment.

From a technical perspective, the content interceptor 44 and/or relay engine 45 described above may be used to support some or all of the operations described above. As such, the platform described in FIGS. 1-2 may be used to facilitate the implementation of several computer program and/or network communication based interactions. As an example, FIG. 3 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a proxy server (e.g., the content interceptor 44 and/or relay engine 45) and executed by a processor in the proxy server. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method for modifying and relaying advertising content according to one embodiment of the invention, as shown in FIG. 3, may include intercepting, at a network (and sometimes at the edge of the network) providing communication between an end user device and one or more servers capable of responding to requests from the end user device, a request from the end user device and transmitted via the network at operation 200. The method may further include determining whether a response to the request will include advertising content based on a destination of the request at operation 210. The destination of the request may, for example, be a known or blacklisted ad server (e.g., the advertising content server 41). Of note, regardless of the determination, the request is passed along unmodified. However, if the destination address is a known or blacklisted ad server, then the response may be awaited for interception. As such, the method may further include intercepting the response based on the determination at operation 220. The method may further include modifying the response to modify source indicia of the advertising content in the form of a modified response at operation 230. Of note, only the first two or three packets of the response may typically need to be parsed, since enough information can be gathered to effectively enable modification. Subsequent packets can be ignored, and thus any delay associated with the modification may be relatively small. The method may further include enabling the modified response to be provided to the end user device at operation 240. The modified content may effectively be relayed from a different source that is not blacklisted. Other modifications to technical properties or to augment the content itself may also be employed in some cases.

In an example embodiment, an apparatus for performing the method of FIG. 3 above may comprise a processor (e.g., the processor 52) or processing circuitry configured to perform some or each of the operations (200-240) described above. The processor may, for example, be configured to perform the operations (200-240) by performing hardware implemented logical functions, executing stored instructions, or executing algorithms for performing each of the operations.

In some embodiments, the processor or processing circuitry may be further configured for additional operations or optional modifications to operations 200-240. The additional operations or optional modifications may each be performed individually or in any combination with each other. In this regard, for example, modifying the response is performed responsive to a determination that an original source of the advertizing content is a blacklisted source. In an example embodiment, the different source is not blacklisted. In some cases, the method further includes modifying technical properties of the advertizing content in the modified response. In an example embodiment, modifying the technical properties comprises modifying properties corresponding to size and shape of the advertizing content. In an example embodiment, modifying properties corresponding to size and shape of the advertizing content comprises employing a random modification to the size and shape of the advertizing content. In some cases, the method further includes modifying elements of the advertizing content to include at least some replaced content in the modified response. In an example embodiment, the different source is a candidate stored in a repository associated with a proxy server at the edge of the network. In some cases, the method further includes modifying elements of the advertizing content to personalize the advertizing content in the modified response. In some cases, the method further includes applying virus scanning to the modified response prior to provision of the modified response to the end user. In some cases, intercepting the request may be performed in response to a prior election of the user to enable content relaying or modification at the end user device. In other words, the user may manually set a browser (e.g., client application 22) at the end user device (e.g., client 20) to use HTTP proxies and enable operation of the content interceptor 44 and/or relay engine 45. However, in other cases, when the network 30 is a private network, the network 30 can force the use of the proxy and thereby force the requests from the end user to be evaluated by the content interceptor 44 and/or relay engine 45. In other examples, web cache communication protocol (WCCP) may be employed to ensure that browsers on private networks automatically configure to use the content interceptor 44 and/or relay engine 45.

Example embodiments may allow for better and more targeted advertisement that can be more likely assured to reach the intended audience and avoid ad blockers. Content can truly be targeted to the needs and profile of the end user, based on the end user details known as part of their customer record, and based on knowing the complete set of Internet domains the end user connects to instead of purely guessing or using keyword matching against page contents.

Revenue from ads can be shared between network edge points (e.g., ISPs or private network operators) and the content providers based on the proportions of ads served and/or clicked. The ad contents can be managed by the edge networks on behalf of their agents, and therefore the content can always be relevant to the country or market that the end user is located in. This avoids wastage associated with having users in one location browse content associated with another location and seeing ads for products or services that are not even available in their own location.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus provided at a network providing communication between an end user device and one or more servers capable of responding to requests from the end user device, the apparatus comprising processing circuitry configured to, when executed:
   intercept a request from the end user device and transmitted via the network;
   determine whether a response to the request will include advertizing content based on a destination of the request;
   intercept the response based on the determination;
   modify the response to modify source indicia of the advertizing content in a modified response; and
   enable the modified response to be provided to the end user device to effectively relay the advertizing content from a different source.

2. The apparatus of claim 1, wherein modifying the response is performed responsive to a determination that an original source of the advertizing content is a blacklisted source.

3. The apparatus of claim 2, wherein the different source is not blacklisted.

4. The apparatus of claim 1, wherein the processing circuitry is further configured to modify technical properties of the advertizing content in the modified response.

5. The apparatus of claim 4, wherein modifying the technical properties comprises modifying properties corresponding to size and shape of the advertizing content.

6. The apparatus of claim 4, wherein modifying properties corresponding to size and shape of the advertizing content comprises employing a random modification to the size and shape of the advertizing content.

7. The apparatus of claim 1, wherein the processing circuitry is further configured to modify elements of the advertizing content to include at least some replaced content in the modified response.

8. The apparatus of claim 1, wherein the different source is a candidate stored in a repository associated with a proxy server at an edge of the network.

9. The apparatus of claim 1, wherein the processing circuitry is further configured to modify elements of the advertizing content to personalize the advertizing content in the modified response.

10. The apparatus of claim 1, wherein the processing circuitry is further configured to apply virus scanning to the modified response prior to provision of the modified response to the end user.

11. A method executable via operation of configured processing circuitry, the method comprising:
intercepting, at a network providing communication between an end user device and one or more servers capable of responding to requests from the end user device, a request from the end user device and transmitted via the network;
determining whether a response to the request will include advertizing content based on a destination of the request;
intercepting the response based on the determination;
modifying the response to modify source indicia of the advertizing content in a modified response; and
enabling the modified response to be provided to the end user device to effectively relay the advertizing content from a different source.

12. The method of claim 11, wherein modifying the response is performed responsive to a determination that an original source of the advertizing content is a blacklisted source.

13. The method of claim 12, wherein the different source is not blacklisted.

14. The method of claim 11, further comprising modifying technical properties of the advertizing content in the modified response.

15. The method of claim 14, wherein modifying the technical properties comprises modifying properties corresponding to size and shape of the advertizing content.

16. The method of claim 14, wherein modifying properties corresponding to size and shape of the advertizing content comprises employing a random modification to the size and shape of the advertizing content.

17. The method of claim 1, further comprising modifying elements of the advertizing content to include at least some replaced content in the modified response.

18. The method of claim 1, wherein the different source is a candidate stored in a repository associated with a proxy server at an edge of the network.

19. The method of claim 1, further comprising modifying elements of the advertizing content to personalize the advertizing content in the modified response.

20. The method of claim 1, further comprising applying virus scanning to the modified response prior to provision of the modified response to the end user.

* * * * *